US008834259B2

(12) United States Patent
Rommerdahl et al.

(10) Patent No.: US 8,834,259 B2
(45) **Date of Patent: *Sep. 16, 2014**

(54) GAMING DEVICE USING AN INTERACTIVE WHEEL FEATURE

(71) Applicant: Bally Gaming, Inc., Las Vegas, NV (US)

(72) Inventors: William Rommerdahl, Huntington Beach, CA (US); Michael J. Schutt, Huntington Beach, CA (US); James P. S. Kowalski, Whittier, CA (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/975,117

(22) Filed: Aug. 23, 2013

(65) Prior Publication Data

US 2014/0018142 A1 Jan. 16, 2014

Related U.S. Application Data

(63) Continuation of application No. 12/828,183, filed on Jun. 30, 2010, now Pat. No. 8,535,141.

(60) Provisional application No. 61/261,452, filed on Nov. 16, 2009.

(51) Int. Cl.

| | |
|---|---|
| ***G06F 17/00*** | (2006.01) |
| ***G06F 19/00*** | (2011.01) |
| ***G07F 17/32*** | (2006.01) |

(52) U.S. Cl.

CPC ........ *G07F 17/3267* (2013.01); *G07F 17/3209* (2013.01); *G07F 17/3211* (2013.01)

USPC .................................. 463/20; 463/16; 463/31

(58) Field of Classification Search

USPC .......... 463/16–20, 25, 29–31; 273/138.1, 139

See application file for complete search history.

(56) References Cited

U.S. PATENT DOCUMENTS

| | | | | |
|---|---|---|---|---|
| 5,788,573 | A | 8/1998 | Baerlocher et al. | |
| 5,934,672 | A | 8/1999 | Sines et al. | |
| 6,162,121 | A | 12/2000 | Morro et al. | |
| 7,311,604 | B2 | 12/2007 | Kaminkow et al. | |
| 7,789,756 | B2 | 9/2010 | Jones et al. | |
| 7,896,738 | B2 | 3/2011 | Okada | |
| 7,918,726 | B2 | 4/2011 | Okada | |
| 7,922,574 | B2 | 4/2011 | Okada | |
| 8,535,141 | B2 * | 9/2013 | Rommerdahl et al. | 463/20 |
| 2003/0153385 | A1 | 8/2003 | Ikeya et al. | |
| 2004/0053661 | A1 | 3/2004 | Jones et al. | |
| 2004/0166930 | A1 | 8/2004 | Beaulieu et al. | |
| 2004/0198485 | A1 | 10/2004 | Loose et al. | |
| 2005/0032568 | A1 | 2/2005 | Griswold et al. | |
| 2005/0192090 | A1 | 9/2005 | Muir et al. | |
| 2006/0046823 | A1 | 3/2006 | Kaminkow et al. | |
| 2007/0054723 | A1 | 3/2007 | Mattice et al. | |
| 2008/0051190 | A1 | 2/2008 | Okada | |
| 2008/0058063 | A1 | 3/2008 | Okada | |

(Continued)

*Primary Examiner* — Milap Shah
(74) *Attorney, Agent, or Firm* — Brooke Quist; Marvin Hein

(57) ABSTRACT

Disclosed is a gaming device including an interactive animated representation of a wheel image or partial wheel image. A player of the device can start the wheel image spinning by touching and dragging their finger on the surface of the wheel image in order to move and spin the wheel image at a variety of speeds and directions.

17 Claims, 10 Drawing Sheets

(56) References Cited

U.S. PATENT DOCUMENTS

| | | | |
|---|---|---|---|
| 2008/0064499 A1 | 3/2008 | Grant et al. |
| 2009/0111577 A1 | 4/2009 | Mead |
| 2009/0124345 A1 | 5/2009 | Gilmore et al. |
| 2009/0131145 A1 | 5/2009 | Aoki et al. |
| 2009/0191946 A1 | 7/2009 | Thomas et al. |
| 2011/0070940 A1 | 3/2011 | Jaffe et al. |
| 2011/0118014 A1 | 5/2011 | Mitchell et al. |
| 2011/0306402 A1 | 12/2011 | Van Linden |

* cited by examiner

GAMING DEVICE USING AN INTERACTIVE WHEEL FEATURE

CROSS-REFERENCE TO RELATED APPLICATIONS

This application is a continuation of U.S. patent application Ser. No. 12/828,183, filed Jun. 30, 2010 now U.S. Pat. No. 8,535,141, entitled "Gaming Device Using an Interactive Wheel Feature," which claims the benefit of U.S. Provisional Application No. 61/261,452, filed Nov. 16, 2009, both of which are incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

The disclosed embodiments are directed to wagering games, gaming machines, networked gaming systems and methods, and in particular to wagering games, gaming machines, networked gaming systems and methods having accumulation-style feature games.

BACKGROUND

In the past, various types of gaming machines have been developed with different features to captivate and maintain player interest. In general, a gaming machine allows a player to play a game in exchange for a wager. Depending on the outcome of the game, the player may be entitled to an award which is paid to the player by the gaming machine, normally in the form of currency or game credits. Gaming machines may include flashing displays, lighted displays, or sound effects to capture a player's interest in a gaming device.

Another important feature of maintaining player interest in a gaming machine includes providing the player with many opportunities to win awards, such as cash or prizes. For example, in some slot machines, the display windows show more than one adjacent symbol on each reel, thereby allowing for multiple-line betting.

Some gaming machine games today include one or more progressive prize awards. In some configurations, the progressive prize may have a small probability of being won by a player. Such a configuration makes it possible to have a larger progressive prize. In other game configurations, the progressive prize may be a small amount, which enables a player to win the progressive prize more frequently. In most typical game configurations, the player wins the progressive prize as a result of a specific game outcome within the primary or main game.

Feature games of various types have been employed to reward players above the amounts normally awarded on a standard game pay schedule. Generally, such feature games are triggered by predetermined events such as one or more appearances of certain combinations of indicia in a primary game. In order to stimulate interest, feature games are typically set to occur at a gaming machine on a statistical cycle based upon the number of primary game plays.

While gaming machines including feature games have been successful, there remains a need for feature games that provide players with enhanced excitement and an increased opportunity of winning.

SUMMARY

Briefly, and in general terms, the gaming device provides a system for playing a base game and a feature game that includes an interactive animated representation of at least a portion of a wheel image. The system including a display screen for displaying a gaming presentation; a plurality of animated reels or physical reels, wherein the reels are spun during the play of the base game; one or more player-activated buttons for receiving player input; and a processor, wherein the processor executes game software and processes input from the player-activated buttons. The activation of the base game includes rotation of the reels. The display of a particular symbol on one or more of the reels after the rotation has stopped triggers the feature game played with the interactive animated wheel image. Notably, by touching and dragging a finger on the surface of the wheel image, the player may move or spin the wheel image at a variety of speeds and in either direction of rotation. The receipt of a particular symbol or number on the interactive animated wheel triggers one or more prizes associated with winning on the feature game.

In an aspect of one embodiment, the player may cock the wheel image by spinning the wheel image slightly in one direction before starting the wheel image in motion in an opposite direction. In another aspect, the wheel spin speed may be based on the distance from where the player initially touches the wheel image to where the player removes his finger, when the player is attempting to move the wheel image in a direction. In still another aspect, a player moving his finger tangentially to the axis of the wheel image produces a greater rotational wheel speed, the closer his finger is to a center of the wheel image, due to creation of a higher rotational velocity than if the player had moved his finger at a same speed farther away from the center of the wheel image.

In another aspect, the player-activated buttons are touch screen virtual buttons. However, in another embodiment, the player-activated buttons are physical buttons. In another aspect of one embodiment, the animated representation of a wheel image comprises a full wheel image. Nevertheless, in another embodiment, the animated representation of a wheel image comprises a portion of a wheel image.

Referring now to yet another aspect, in one embodiment, the feature game that includes the animated representation of a wheel image is associated with one or more progressive prizes. However, in another embodiment, the feature game that includes the animated representation of a wheel image is associated with one or more non-progressive prizes.

Continuing, in an aspect of one embodiment, the plurality of reels are placed behind transparent LCD (Liquid Crystal Display) windows. In one such embodiment, the reels are hidden by the appearance of masked prizes on the LCD windows in front of the plurality of reels when a feature game is triggered. Additionally, in one embodiment, upon touching one of the masked prizes on the LCD windows, the prize value is revealed and awarded to the player.

In one or more embodiments, the interactive wheel game includes awarding feature play when certain symbols appear on a pay line, when certain symbols are scattered, or when no symbols of a certain type appear, regardless of visible symbols. In some embodiments, the availability of the feature game is restricted based on the size of the wager and the placement of the wager. Additionally, in some embodiments a percentage of the wager is used to fund the feature game. In yet another aspect, the probability of winning the feature game is dependent on the size of the wager.

Features and advantages will become apparent from the following detailed description, taken in conjunction with the accompanying drawings, which illustrate by way of example, the features of the various embodiments.

DETAILED DESCRIPTION OF PREFERRED EMBODIMENTS

Figure 1:
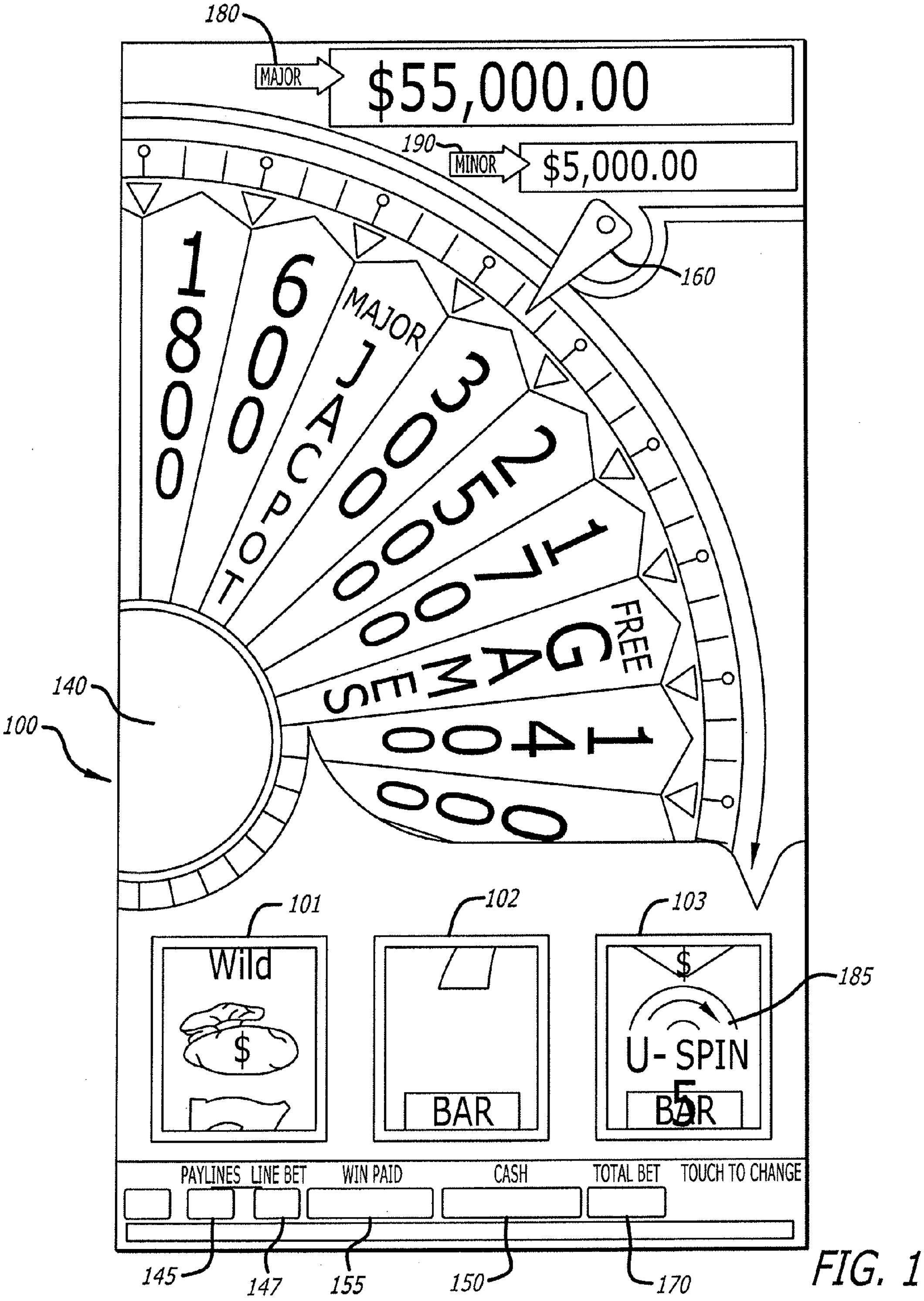
FIG. 1 provides an overview of a gaming device game of one embodiment.

Various embodiments are directed to a game, gaming machine, gaming networks and method for playing a game, wherein the game includes an interactive wheel feature game. The embodiments are illustrated and described herein, by way of example only, and not by way of limitation. Referring now to the drawings, and more particularly to FIGS. 1-7, there are shown illustrative examples of games, gaming machines, gaming networks and methods for playing a game in accordance with various aspects of the disclosed embodiments.

Figure 2:
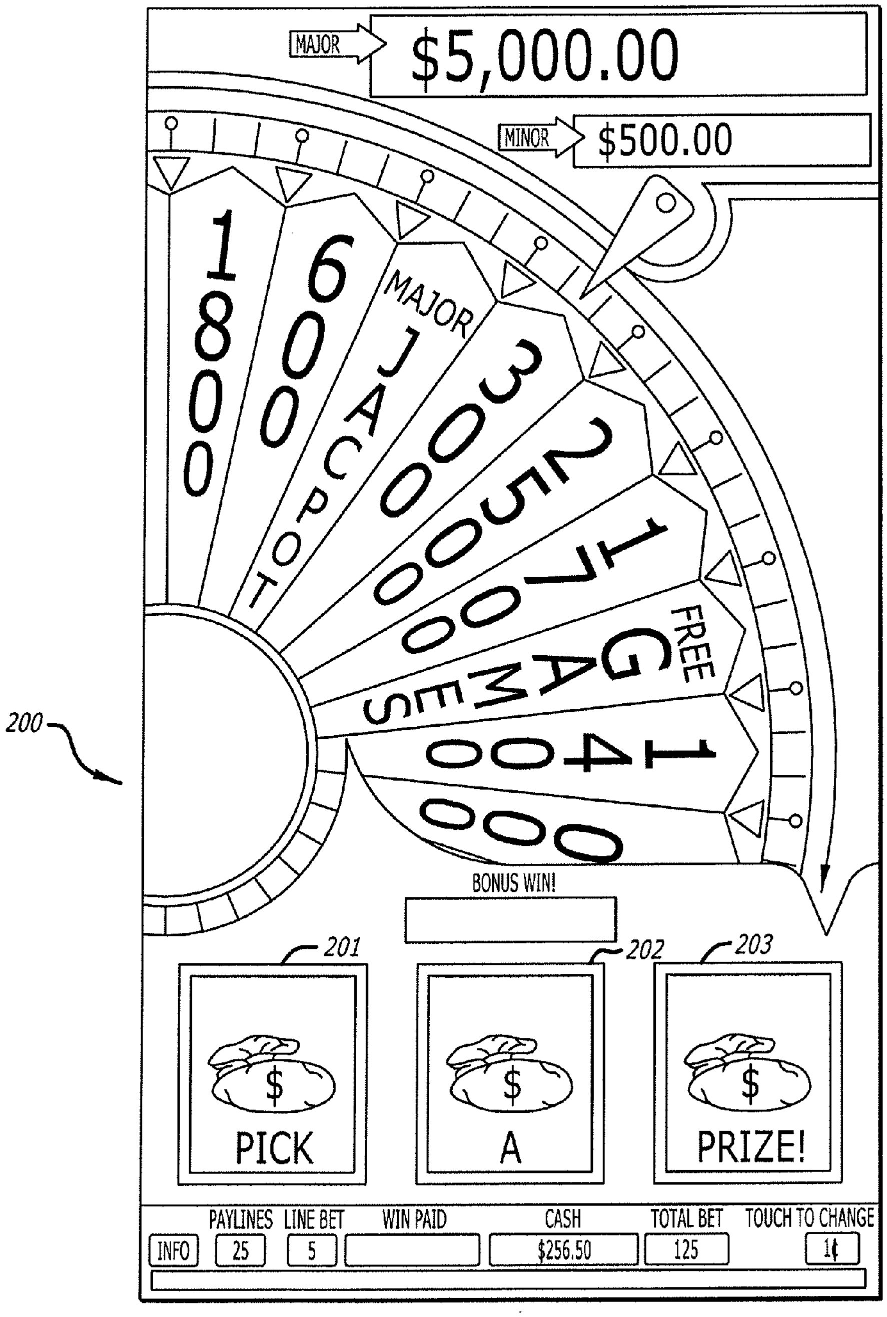
FIG. 2 illustrates a feature game in accordance with one or more embodiments.
Figure 3:
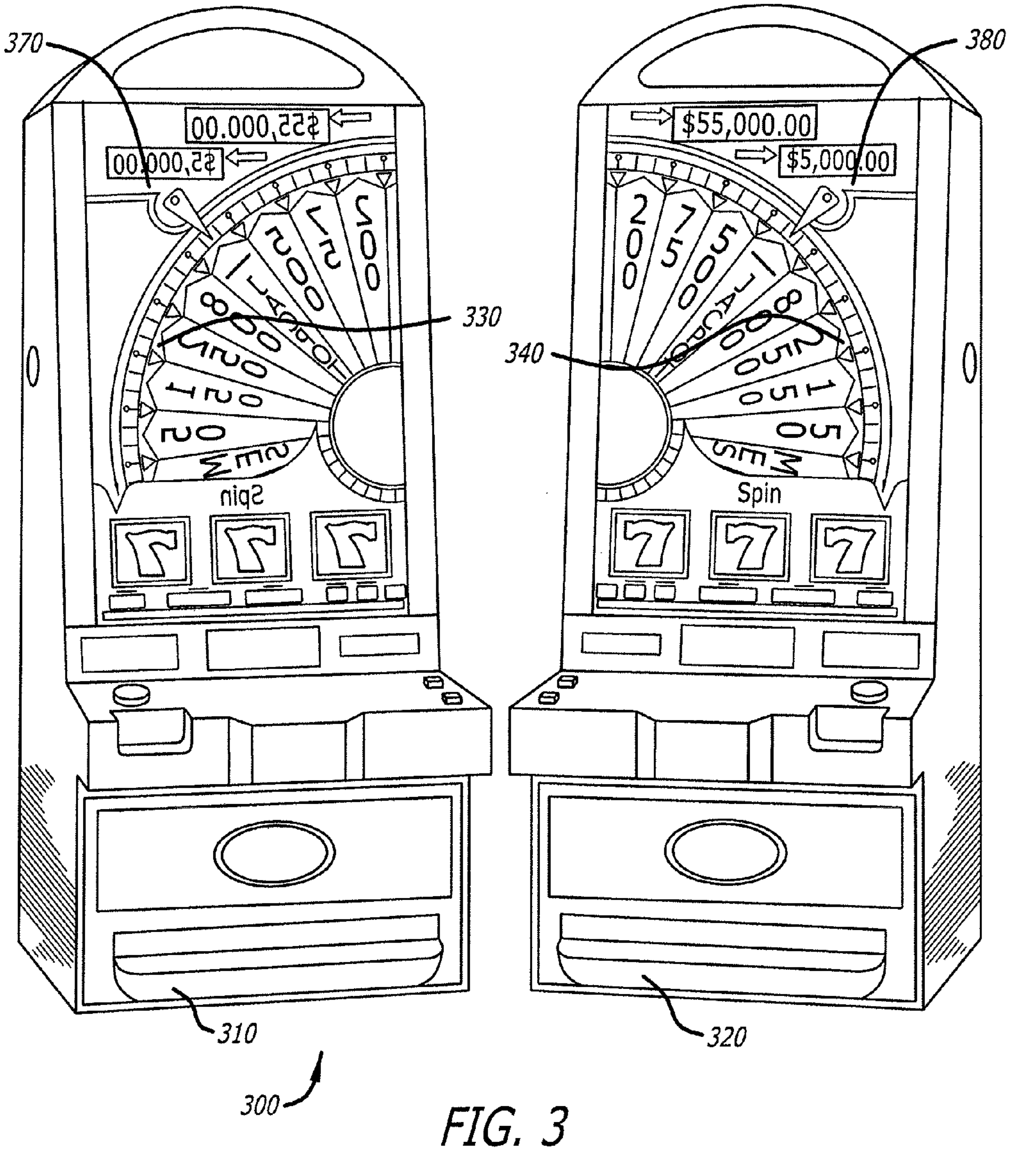
FIG. 3 illustrates an example of gaming machines configured for group play in accordance with one or more embodiments.

An example game in accordance with one or more aspects of the disclosed embodiments is shown in FIGS. 1-3. Referring to FIG. 1, game 100 is implemented using three spinning reels 101-103. Each of the twenty-five pay line patterns (not shown) passes through one indicium on each of the three reels. The number of pay lines and their patterns are described by way of example only, and may vary. In one embodiment, the player selects the number of played pay lines 145 and the number of credits or coins wagered on each line 147 using touch screen controls or gaming device control buttons. The WIN PAID meter 155 provides the player with information about the amount paid by the last game played. The CASH METER 150 displays the total number of cash or credits available for play. Continuing, in this embodiment, the TOTAL BET meter 170 displays the size of the currently-selected wager. Preferably, the player may collect the balance of his credits by pressing a COLLECT button (not shown).

In one example of game play using the interactive wheel feature game, the player initiates game play by pressing a SPIN button (not shown). In some embodiments, the player may simultaneously select all pay lines at the maximum number of coins or credits allowed per line by pressing a MAX BET button (not shown). Various controls/buttons (see FIG. 4, 460) on gaming machine 400 (FIG. 4) or touch screen buttons may be used to perform the actions described herein without deviating from the scope of the disclosed embodiments. Reels 101-103 are made to spin and stop in predetermined stop positions in response to the player pressing the SPIN button. A determination is made whether the stop positions of the reels represents a winning game outcome. A winning combination, for example, could be three or more symbols aligned on a pay line from left to right. For each winning combination, the game device awards the player the award in a pay table, adjusted as necessary based on the number of credits wagered on the pay line on which the win occurred.

In some embodiments, various primary game outcomes may be utilized to trigger the play of one or more feature games, including, but not limited to, awarding feature play when certain symbols appear on a pay line, when certain symbols are scattered, when no symbols of a certain type appear, when a certain winning combination occurs, or at random or fixed intervals (regardless of the visible symbols).

In accordance with one embodiment, the appearance of a U-SPIN symbol 185 on reel 103 triggers a feature game played with an interactive animated representation of a wheel or partial wheel 140. By touching and dragging a finger on the surface of the wheel image, the player may move and spin the wheel (or a representation of a wheel) at a variety of speeds and in either direction of rotation. The wheel spin speed may be based on the distance from where the player initially touches the wheel and removes his finger when moving in a same direction. In this manner, a player moving his finger tangentially to the axis of the wheel will produce a greater rotational wheel speed, the closer his finger is to center of the wheel, due to there being a higher rotational velocity than if the player had moved his finger at the same speed farther away from the center of the wheel. The distance traveled and the rate of travel is used to determine a relative initial wheel velocity.

In some embodiments, the player may "cock" the wheel by spinning it slightly counter clock-wise before starting it in motion with a clock-wise finger swipe, or vice-versa. Once the wheel starts to spin and the player's finger is removed from the surface of the wheel, the wheel display gradually slows down from its initial spin rate until a segment of the wheel stops adjacent to pointer 160. The award in the adjacent segment is then paid to the player. Awards may include credit amounts, one or more progressive jackpot awards 180 and 190, or a number of free plays of the base game. The availability of the feature game may be restricted based on the size of the wager or the placement of a separate wager. Additionally, or alternatively, a percentage of each game wager may be explicitly allocated to the funding of the feature games.

In another aspect of one embodiment, progressive awards 180 and 190 may be calculated by a progressive controller such as a controller manufactured by Mikohn, Inc., located at 920 Pilot Rd, Las Vegas, 89119 Nevada. The progressive controller monitors wagering during base game play, calculates a current value for one or more progressive jackpot pools, and transmits the current pool values to the gaming machine. In one or more embodiments, progressive awards are accumulated during regular play as a percentage, such as three percent, of the game play take. The prizes may be sized according to the preferences of the casino operator. The number of prizes may vary without deviating from the scope of the disclosed embodiments. The size of the prizes is dependent on the amount of play prior to initiating feature play and may come from the contributions of a single gaming machine or a number of linked gaming machines. In another aspect, the prizes may be set amounts established by the casino operator from non-coin-in funds, such as marketing funds. The probability of winning one of the progressives may be dependent on the size of the wager made by the player, with a larger wager making it more likely that a progressive will be won. Alternately, the progressive prize awarded may be a percentage of the total progressive pool, which is the percentage based on wager size.

In one or more embodiments, the prizes for progressive awards may be accumulated based on funding mechanisms other than a percentage of wagers accumulated by the gaming machine. For example, an operator may initially fund various award pools with a pre-determined amount of money, such as $10,000 for progressive 180, $1000 for progressive 190, and so on. Subsequently, the casino operator may determine to increase the amounts of one or more of the awards at predetermined times, which may be periodically or randomly selected with a range of times or periods. Once a winner has occurred at any level, the award levels may be rolled back to their initial funding amount. In one or more embodiments, only the winning award level is rolled back to the initial funding amount.

In one or more embodiments, the major prizes 180 and minor prizes 190 for game play may be set amounts, i.e. non-progressive. In some embodiments, the algorithms to determine the amounts may be determined by a statistical percentage based on an average take of a gaming machine and the likelihood of the win over a period of time. In the case where one or more gaming machines are networked, a common award table may be utilized where the award algorithms are determined based on an average take (total wagers) of all the networked gaming machines and the likelihood of a win of an award over a period of time. Each award may be calculated in a similar manner based on the likelihood of a winning outcome being achieved during a game play session.

In accordance with one or more embodiments, FIG. 2 illustrates a second feature game 200. In some embodiments, reels 201-203, corresponding to reels 101-103 on FIG. 1, are video representations of reels. Each of reels 201-203 are temporarily replaced by images of masked prizes. When the player touches one of the prizes, its value is revealed and awarded to the player. In alternate embodiments, reels 201-203 are physical reels placed behind transparent LCD windows. When the feature game 200 is triggered, the physical reels are hidden by the appearance of the masked prizes. Once the player has selected his prize and been given his award, the images hiding the physical reels are removed and they are once again available for play. U.S. patent application Ser. No. 12/113,104, filed Apr. 30, 2008, entitled METHOD FOR INTERACTING A DISPLAY WITH MECHANICAL REELS, which is incorporated herein by reference in its entirety, provides examples of an interactive display with mechanical reels.

Referring to FIG. 3, in accordance with one or more embodiments, each gaming machine 310 and 320 in a bank of two or more gaming machines is enabled to provide a wheel-based feature game as described above. Gaming machines 310 and 320 are arranged in pairs so that the representation of a partial wheel 330 of gaming machine 310 provides additional segments for the representation of a partial wheel 340 of gaming machine 320. For example, each partial wheel in the example represents approximately one quarter of a wheel face. Combined, partial wheels 330 and 340 can visually represent one half of a wheel face. Games so arranged may be used for partner or group play. For example, whenever either player of machine 310 or machine 320 triggers a wheel feature game, both partial wheels spin in synchronized timing between both machines, and both players win a prize associated with the segment stopping adjacent to their respective wheel pointers 370 and 380. U.S. patent application Ser. No. 12/112,389, filed Apr. 30, 2008, entitled COORDINATING GROUP PLAY EVENT FOR MULTIPLE GAME DEVICES, which is incorporated herein by reference in its entirety, provides examples of some techniques for interconnecting gaming machines for coordinated group play.

Figure 4:
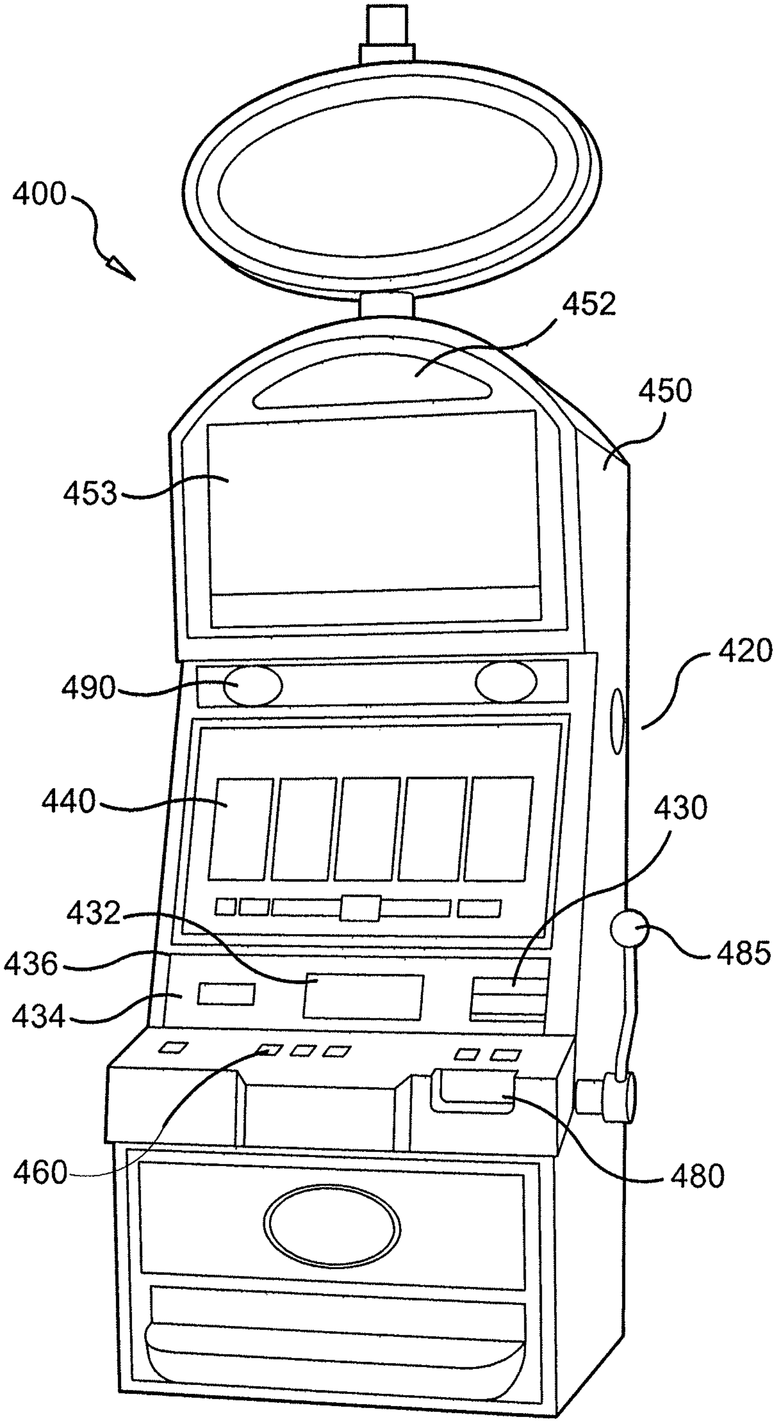
FIG. 4 is a perspective view of a gaming machine in accordance with one or more embodiments.
Figure 4A:
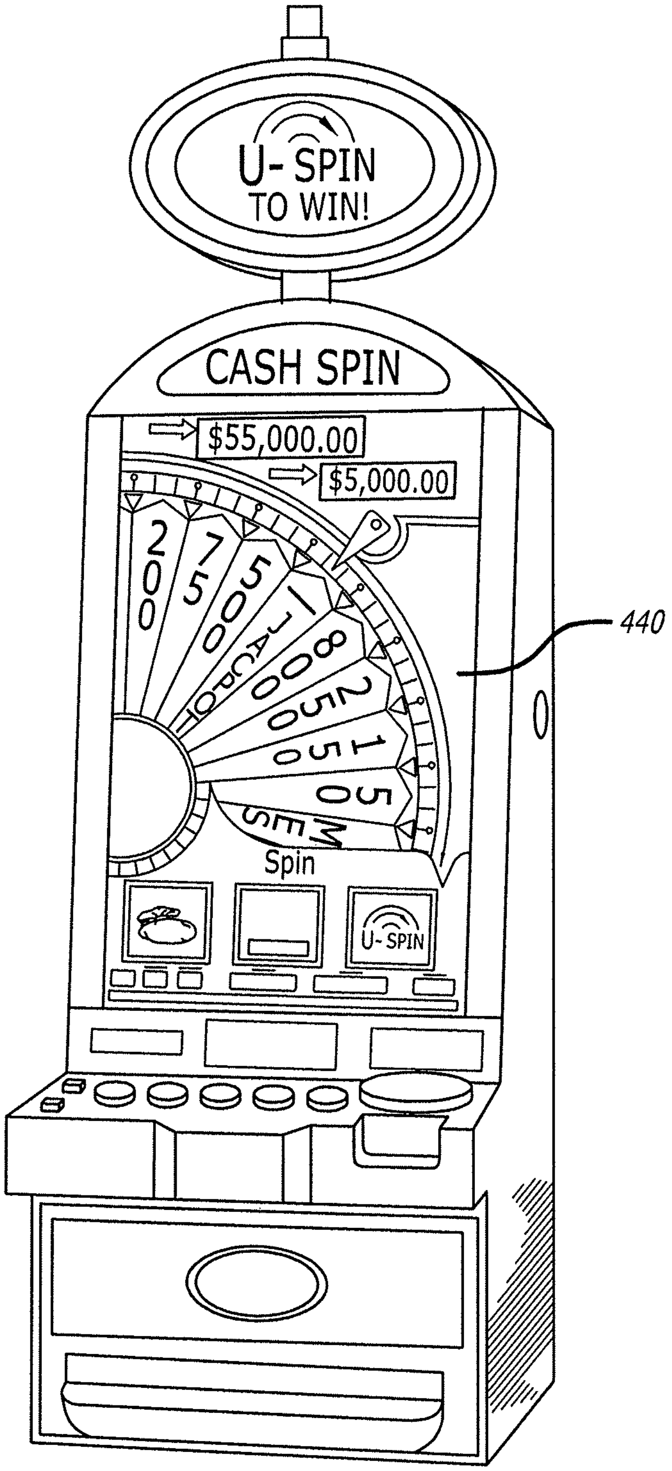
FIG. 4A is a perspective view of another embodiment of a gaming machine.

In accordance with one or more embodiments, FIGS. 4 and 4A illustrate a gaming machine 400 including cabinet housing 420, primary game display 440 upon which a primary game and feature game may be displayed, top box 450 which may display multiple progressives that may be won during play of the primary or feature game, player-activated buttons 460, player tracking panel 436, bill/voucher acceptor 480, and one or more speakers 490. Cabinet housing 420 is a self-standing unit that is generally rectangular in shape and may be manufactured with reinforced steel or other rigid materials which are resistant to tampering and vandalism. Cabinet housing 420 houses a processor, circuitry, and software (not shown) for receiving signals from the player-activated buttons 460, operating the games, and transmitting signals to the respective displays and speakers. Any shaped cabinet may be implemented with any embodiment of gaming machine 400 so long as it provides access to a player for playing a game. For example, cabinet 420 may comprise a slant-top, bar-top, or table-top style cabinet. The operation of gaming machine 400 is described more fully below.

In another aspect of one embodiment, the plurality of player-activated buttons 460 may be used for various functions such as, but not limited to, selecting a wager denomination, selecting a game to be played, selecting a wager amount per game, initiating a game, or cashing out money from gaming machine 400. Buttons 460 function as input mechanisms and may include mechanical buttons, electromechanical buttons or touch screen buttons. Optionally, a handle 485 may be rotated by a player to initiate a game.

In other embodiments, buttons 460 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated in its entirety by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand. In other embodiments, a virtual button deck may be used to provide similar capabilities. An example of a virtual button deck is disclosed in U.S. application Ser. No. 11/938,203, entitled, "Game Related Systems, Methods, and Articles That Combine Virtual and Physical Elements," filed on Nov. 9, 2007, which is hereby incorporated in its entirety by reference.

Cabinet housing 420 may optionally include top box 450 which contains "top glass" 452 comprising advertising or payout information related to the game or games available on gaming machine 400. Player tracking panel 436 includes player tracking card reader 434 and player tracking display 432. Voucher printer 430 may be integrated into player tracking panel 436 or installed elsewhere in cabinet housing 420 or top box 450.

Game display 440 presents a game of chance wherein a player receives one or more outcomes from a set of potential outcomes. For example, one such game of chance is a video slot machine game. In other aspects, gaming machine 400 may present a video or mechanical reel slot machine, a video keno game, a lottery game, a bingo game, a Class II bingo game, a roulette game, a craps game, a blackjack game, a mechanical or video representation of a primary wheel game or the like.

Mechanical or video/mechanical embodiments may include game displays such as mechanical reels, wheels, or dice as required to present the game to the player. In video/mechanical or pure video embodiments, game display 440 is, typically, a CRT or a flat-panel display in the form of, but not limited to, liquid crystal, plasma, electroluminescent, vacuum fluorescent, field emission, or any other type of panel display known or developed in the art. Game display 440 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. FIG. 4A illustrates an example of a portrait mode game display 440 having widescreen dimensions in accordance with one embodiment. Additionally, game display 440 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference. Furthermore, as described above, game display 440 may include transparent portions which cover and may interact with displays on mechanical reels, as described in U.S. application Ser. No. 12/113,112, entitled, "MECHANICAL REELS WITH INTERACTIVE DISPLAY," filed on Apr. 30, 2008, which is hereby incorporated in its entirety by reference.

Game display 440 may also present information such as, but not limited to, player information, advertisements and casino promotions, graphic displays, news and sports updates, or may even offer an alternate game. This information may be generated through a host computer networked with gaming machine 400 on its own initiative, or it may be obtained by request of the player using either (1) one or more of the plurality of player-activated buttons 460; (2) the game display itself, if game display 440 comprises a touch screen or similar technology; (3) buttons (not shown) mounted on game display 440 which may permit selections such as those found on an ATM machine, where legends on the screen are associated with respective selecting buttons; or (4) any player input device that offers the required functionality.

Cabinet housing 420 incorporates a single game display 440. However, in alternate embodiments, cabinet housing 420 or top box 450 may house one or more additional displays 453 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 5A:
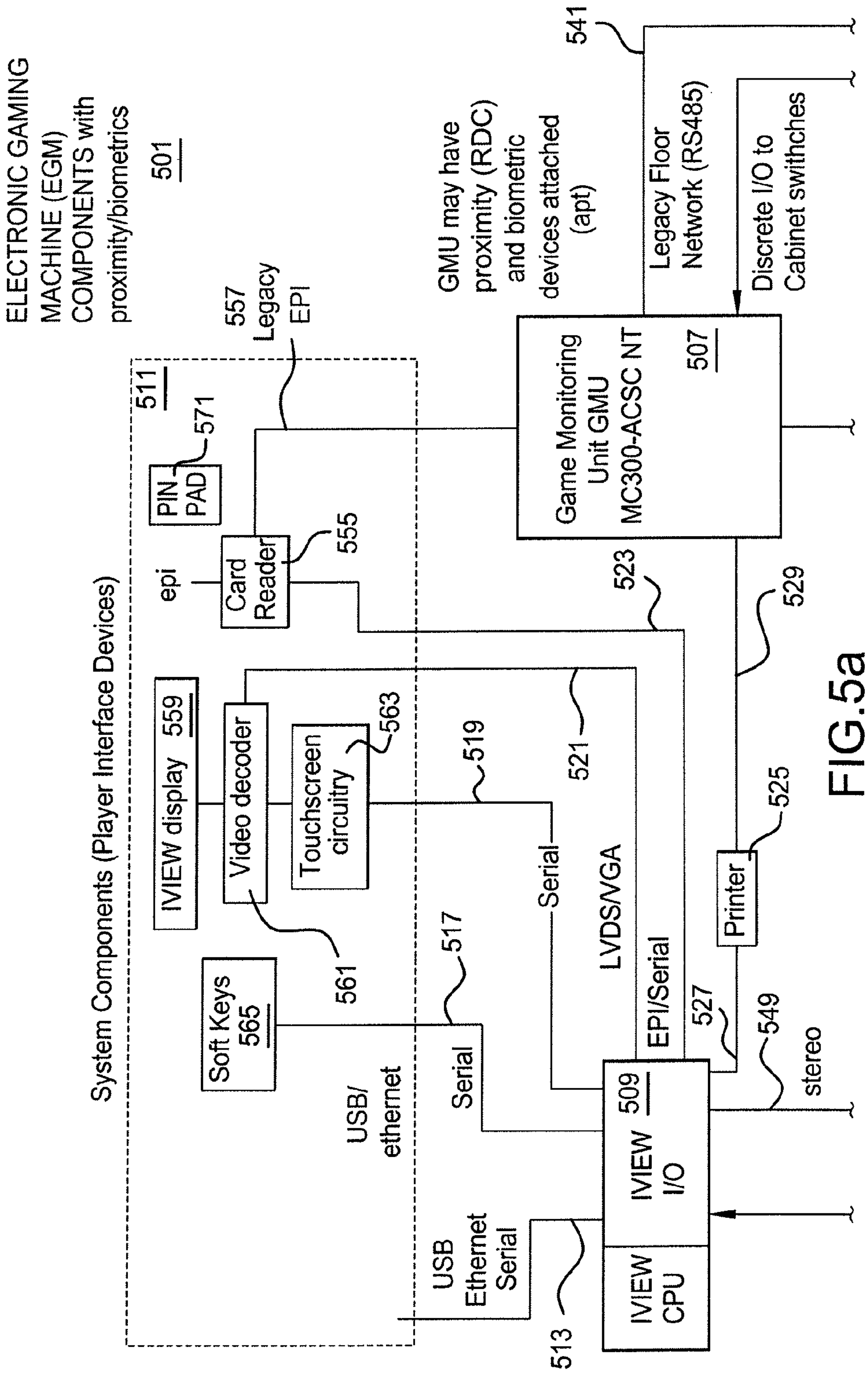
FIGS. 5*a* and 5*b* are block diagrams of the physical and logical components of the gaming machine of FIG. 4.
Figure 5B:
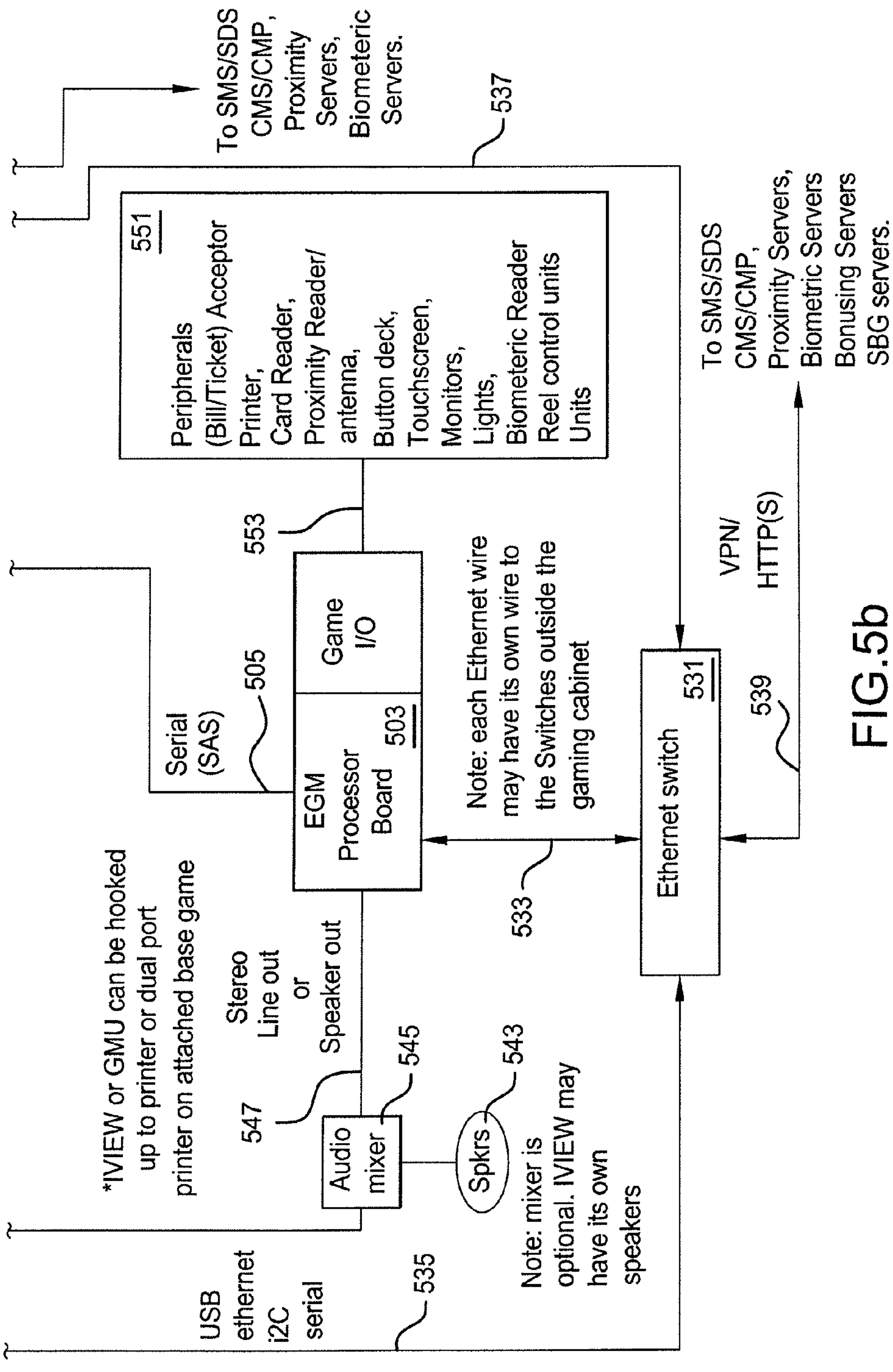

Referring to FIGS. 5*a* and 5*b*, electronic gaming machine 501 is shown in accordance with one or more embodiments. Electronic gaming machine 501 includes base game integrated circuit board 503 (EGM Processor Board) connected through serial bus line 505 to game monitoring unit (GMU) 507 (such as a Bally MC300 or ACSC NT), and player interface integrated circuit board (PIB) 509 connected to player interface devices 511 over bus lines 513, 515, 517, 519, 521, 523. Printer 525 is connected to PIB 509 and GMU 507 over bus lines 527, 529. EGM Processor Board 503, PIB 509, and GMU 507 connect to Ethernet switch 531 over bus lines 533, 535, 537. Ethernet switch 531 connects to a slot management system (SMS) and a casino management system (CMS) network over bus line 539. GMU 507 also may connect to the SMS and CMS network over bus line 541. Speakers 543 connect through audio mixer 545 and bus lines 547, 549 to EGM Processor Board 503 and PIB 509. The proximity and biometric devices and circuitry may be installed by upgrading a commercially available PIB 509, such as a Bally iView unit. Coding executed on EGM Processor Board 503, PID 509, and/or GMU 507 may be upgraded to integrate a game having an interactive wheel game as is more fully described herein.

Peripherals 551 connect through bus 553 to EGM Processor Board 503. For example, a bill/ticket acceptor is typically connected to a game input-output board 553 which is, in turn, connected to a conventional central processing unit ("CPU") board 503, such as an Intel Pentium microprocessor mounted on a gaming motherboard. I/O board 553 may be connected to CPU processor board 503 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Processor board 503 executes a game program that causes processor board 503 to play a game. In one embodiment, the game program provides a slot machine game having an interactive wheel feature game. The various components and included devices may be installed with conventionally and/or commercially available components, devices, and circuitry into a conventional and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 553 to processor board 503 which, in turn, assigns an appropriate number of credits for play in accordance with the game program. The player may further control the operation of the gaming machine by way of other peripherals 551, for example, to select the amount to wager via electromechanical or touch screen buttons. The game starts in response to the player operating a start mechanism such as a handle or touch screen icon. The game program includes a random number generator to provide a display of randomly selected indicia on one or more displays. In some embodiments, the random generator may be physically separate from gaming machine 400. For example, it may be part of a central determination host system which provides random game outcomes to the game program. Thereafter, the player may or may not interact with the game through electromechanical or touch screen buttons to change the displayed indicia. Finally, processor board 503 under control of the game program and OS compares the final display of indicia to a pay table. The set of possible game outcomes may include a subset of outcomes related to the triggering of a feature game. In the event the displayed outcome is a member of this subset, processor board 503, under control of the game program and by way of I/O Board 553, may cause feature game play to be presented on a feature display.

Predetermined payout amounts for certain outcomes, including feature game outcomes, are stored as part of the game program. Such payout amounts are, in response to instructions from processor board 503, provided to the player in the form of coins, credits or currency via I/O board 553 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 507 includes an integrated circuit board and GMU processor and memory including coding for network communications, such as the G2S (game-to-system) protocol from the Gaming Standards Association, Las Vegas, Nev., used for system communications over the network. As shown, GMU 507 may connect to card reader 555 through bus 557 and may thereby obtain player card information and transmit the information over the network through bus 541. Gaming activity information may be transferred by the EGM Processor Board 503 to GMU 507 where the information may be translated into a network protocol, such as S2S, for transmission to a server, such as a player tracking server, where information about a player's playing activity may be stored in a designated server database.

PID 509 includes an integrated circuit board, PID processor, and memory which includes an operating system, such as Windows CE, a player interface program which may be executable by the PID processor together with various input/output (I/O) drivers for respective devices which connect to PID 509, such as player interface devices 511, and which may further include various games or game components playable on PID 509 or playable on a connected network server and PID 509 is operable as the player interface. PID 509 connects to card reader 555 through bus 523, display 559 through video decoder 561 and bus 521, such as an LVDS or VGA bus.

As part of its programming, the PID processor executes coding to drive display 559 and provide messages and information to a player. Touch screen circuitry interactively connects display 559 and video decoder 561 to PID 509, such that a player may input information and cause the information to be transmitted to PID 509 either on the player's initiative or responsive to a query by PID 509. Additionally soft keys 565 connect through bus 517 to PID 509 and operate together with display 559 to provide information or queries to a player and receive responses or queries from the player. PID 509, in turn, communicates over the CMS/SMS network through Ethernet switch 531 and busses 535, 539 and with respective servers, such as a player tracking server.

Player interface devices 511 are linked into the virtual private network of the system components in gaming machine 501. The system components include the iVIEW processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, or gaming machine configurations can be downloaded to the system components from the servers. This data is authenticated prior to installation on the system components.

The system components include the iVIEW processing board and game monitoring unit (GMU) processing board. The GMU and iVIEW can be combined into one like the commercially available Bally GTM iVIEW device. This device may have a video mixing technology to mix the EGM processor's video signals with the iVIEW display onto the top box monitor or any monitor on the gaming device.

Figure 6:
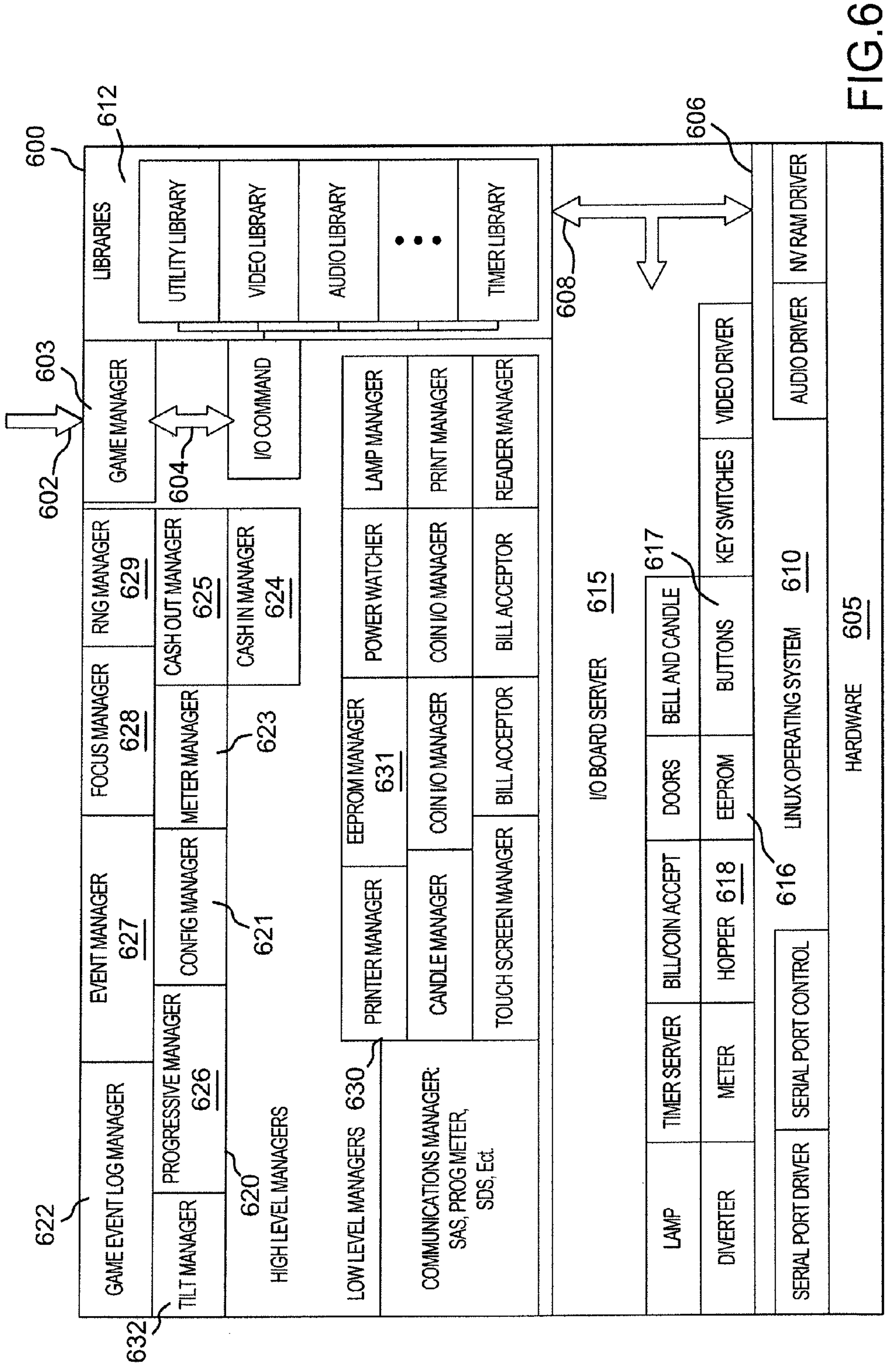
FIG. 6 is a block diagram of the logical components of a gaming kernel in accordance with one or more embodiments.

In accordance with one or more embodiments, FIG. 6 is a functional block diagram of a gaming kernel 600 of a game program under control of processor board 503, using gaming kernel 600 by calling it into application programming interface (API) 602, which is part of game manager 603. The components of game kernel 600, as shown in FIG. 6, are only illustrative and should not be considered limiting. For example, the number of managers may be changed, additional managers may be added or some managers may be removed without deviating from the scope and spirit of the disclosed embodiments.

As shown in the example, there are three layers: a hardware layer 605; an operating system layer 610, such as, but not limited to, Linux; and a game kernel layer 600 having game manager 603 therein. In one or more embodiments, the use of a standard operating system 610, such a UNIX-based or a Windows-based operating system, allows game developers interfacing to the gaming kernel to use any of a number of standard development tools and environments available for the operating systems. This is in contrast to the use of proprietary, low-level interfaces which may require significant time and engineering investments for each game upgrade, hardware upgrade, or feature upgrade. The game kernel layer 600 executes at the user level of the operating system 610, and itself contains a major component called the I/O Board Server 615. To properly set the bounds of game application software (making integrity checking easier), all game applications interact with gaming kernel 600 using a single API 602 in game manager 603. This enables game applications to make use of a well-defined, consistent interface, as well as making access points to gaming kernel 600 controlled, where overall access is controlled using separate processes.

For example, game manager 603 parses an incoming command stream and, when a command dealing with I/O comes in (arrow 604), the command is sent to an applicable library routine 612. Library routine 612 decides what it needs from a device, and sends commands to I/O Board Server 615 (see arrow 608). A few specific drivers remain in operating system 610's kernel, shown as those below line 606. These are built-in, primitive, or privileged drivers that are (i) general, (ii) kept to a minimum, and (iii) are easier to leave than extract. In such cases, the low-level communications are handled within operating system 610, and the contents are passed to library routines 612.

Thus, in a few cases library routines may interact with drivers inside operating system 610, which is why arrow 608 is shown as having three directions (between library utilities 612 and I/O Board Server 615, or between library utilities 612 and certain drivers in operating system 610). No matter which path is taken, the logic needed to work with each device is coded into modules in the user layer of the diagram. Operating system 610 is kept as simple, stripped down, and common across as many hardware platforms as possible. The library utilities and user-level drivers change as dictated by the game cabinet or game machine in which it will run. Thus, each game cabinet or game machine may have an industry standard processor board 505 connected to a unique, relatively dumb, and as inexpensive as possible I/O adapter board 540, plus a gaming kernel 600 which will have the game-machine-unique library routines and I/O Board Server 615 components needed to enable game applications to interact with the gaming machine cabinet. Note that these differences are invisible to the game application software with the exception of certain functional differences (i.e., if a gaming cabinet has stereo sound, the game application will be able to make use of API 602 to use the capability over that of a cabinet having traditional monaural sound).

Game manager 603 provides an interface into game kernel 600, providing consistent, predictable, and backwards-compatible calling methods, syntax, and capabilities by way of game application API 602. This enables the game developer to be free of dealing directly with the hardware, including the freedom to not have to deal with low-level drivers as well as the freedom to not have to program lower-level managers 630, although lower-level managers 630 may be accessible through game manager 603's interface 602 if a programmer has the need. In addition to the freedom derived from not having to deal with the hardware level drivers and the freedom of having consistent, callable, object-oriented interfaces to software managers of those components (drivers), game manager 603 provides access to a set of upper level managers 62Q also having the advantages of consistent callable, object-oriented interfaces, and further providing the types and kinds of base functionality required in casino-type games. Game manager 603, providing all the advantages of its consistent and richly functional interface 602 as supported by the rest of game kernel 600, thus provides a game developer with a multitude of advantages.

Game manager 603 may have several objects within itself, including an initialization object (not shown). The initialization object performs the initialization of the entire game machine, including other objects, after game manager 603 has started its internal objects and servers in appropriate order. In order to carry out this function, the kernel's configuration manager 621 is among the first objects to be started. The configuration manager 621 has the data needed to initialize and correctly configure other objects or servers.

The upper level managers 620 of game kernel 600 may include game event log manager 622 which provides, at the least, a logging or logger base class, enabling other logging objects to be derived from this base object. The logger object is a generic logger. Otherwise stated, the logger object is not aware of the contents of logged messages and events. The log manager's (622) job is to log events in the non-volatile event log space. The size of the space may be fixed, although the size of the logged event is typically not. When the event space or log space fills up, one embodiment deletes the oldest logged event (each logged event has a time/date stamp, as well as other needed information such as length), providing space to record the new event. In this embodiment, the most recent events are found in the log space, regardless of their relative importance. Further provided is the capability to read the stored logs for event review.

In accordance with one embodiment, meter manager 623 manages the various meters embodied in the game kernel 600. This includes the accounting information for the game machine and game play. There are hard meters (counters) and soft meters. The soft meters may be stored in non-volatile storage such as non-volatile battery-backed RAM to prevent loss. Further, a backup copy of the soft meters may be stored in a separate non-volatile storage such as EEPROM. In one embodiment, meter manager 623 receives its initialization data for the meters, during startup, from configuration manager 621. While running, the cash-in (624) and cash-out (625) managers call the meter manager's (623) update functions to update the meters. Meter manager 623 will, on occasion, create backup copies of the soft meters by storing the soft meters' readings in EEPROM. This is accomplished by calling and using EEPROM manager 631.

In accordance with still other embodiments, progressive manager 626 manages progressive games playable from the game machine. Event manager 627 is generic, like log manager 622, and is used to manage various gaming machine events. Focus manager 628 correlates which process has control of various focus items. Tilt manager 632 is an object that receives a list of errors (if any) from configuration manager 621 at initialization, and during game play from processes, managers, drivers, and the like, that may generate errors. A random number generator manager 629 is provided to allow easy programming access to a random number generator (RNG), as a RNG is required in virtually all casino-style (gambling) games. The RNG manager 629 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 625 has the responsibility of configuring and managing monetary output devices. During initialization, cash out manager 625, using data from configuration manager 621, sets the cash out devices correctly and selects any selectable cash out denominations. During play, a game application may post a cash out event through the event manager 627 (the same way all events are handled), and using a callback posted by cash out manager 625, cash out manager 625 is informed of the event. Cash out manager 625 updates the credit object, updates its state in non-volatile memory, and sends an appropriate control message to the device manager that corresponds to the dispensing device. As the device dispenses dispensable media, there typically are event messages being sent back and forth between the device and cash out manager 625 until the dispensing finishes. After the dispensing finishes, the cash out manager 625, having updated the credit manager and any other game state (such as some associated with meter manager 623) that needs to be updated for this set of actions, sends a cash out completion event to event manager 627 and to the game application thereby. The cash in manager 624 functions similarly to cash out manager 625, addressing requirements for controlling, interfacing, and managing actions associated with cashing in events, cash in devices, and associated meters and crediting.

In a further example, in accordance with one or more embodiments, I/O server 615 may write data to the gaming machine EEPROM memory, which is located in the gaming machine cabinet and holds meter storage that must be kept even in the event of power failure. Game manager 603 calls the I/O library functions to write data to the EEPROM. The I/O server 615 receives the request and starts a low priority EEPROM thread 616 within I/O server 615 to write the data. This thread uses a sequence of an 8 bit command, and data writes to the EEPROM device to write the appropriate data in the proper location within the device. Any errors detected are sent as IPC messages to game manager 603. Preferably, all of this processing is asynchronously performed.

In accordance with one embodiment, button module 617 within I/O server 615, polls (or is sent) the state of buttons every two milliseconds. These inputs are debounced by keeping a history of input samples. Certain sequences of samples are required to detect a button was pressed, in which case the I/O server 615 sends an inter-process communication event to game manager 603 that a button was pressed or released. In some embodiments, the gaming machine may have intelligently distributed I/O which debounces the buttons, in which case button module 617 may be able to communicate with the remote intelligent button processor to retrieve the button events and simply relay them to game manager 603 via IPC messages. In still another embodiment, the I/O library may be used for pay-out requests from the game application. For example, hopper module 618 must start the hopper motor, constantly monitor the coin sensing lines of the hopper, debounce them, and send an IPC message to the game manager 603 when each coin is paid.

Further details, including disclosure of lower level fault handling and/or processing, are included in U.S. Pat. No. 7,351,151 entitled “Gaming Board Set and Gaming Kemal for Game Cabinets” and provisional U.S. patent application No. 60/313,743, entitled “Form Fitting Upgrade Board Set For Existing Game Cabinets,” filed Aug. 20, 2001; said patent and provisional application of which are both fully incorporated herein by explicit reference.

Figure 7A:
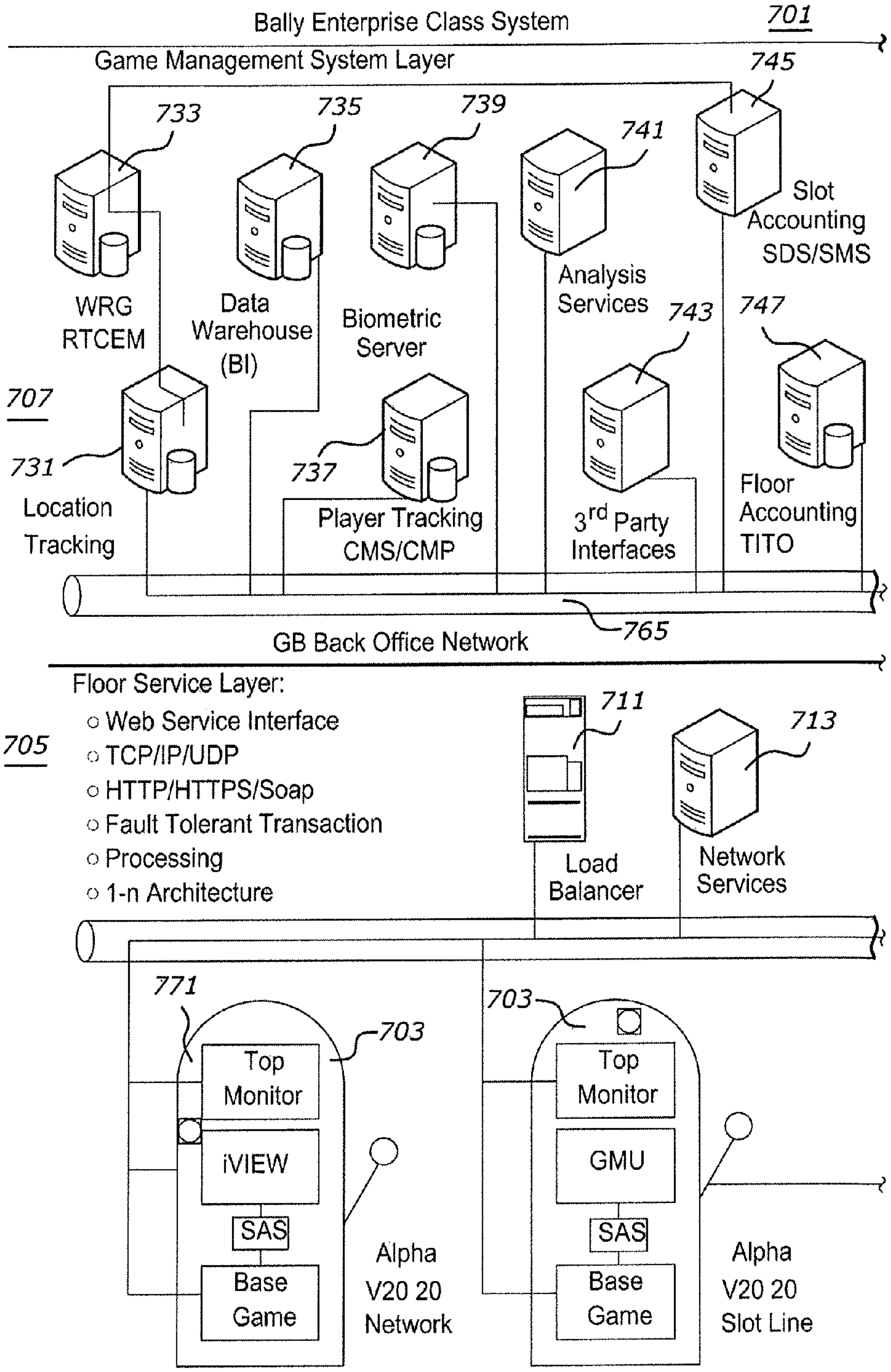
FIGS. 7*a* and 7*b* are schematic block diagrams showing the hardware elements of a networked gaming system in accordance with one or more embodiments.
Figure 7B:
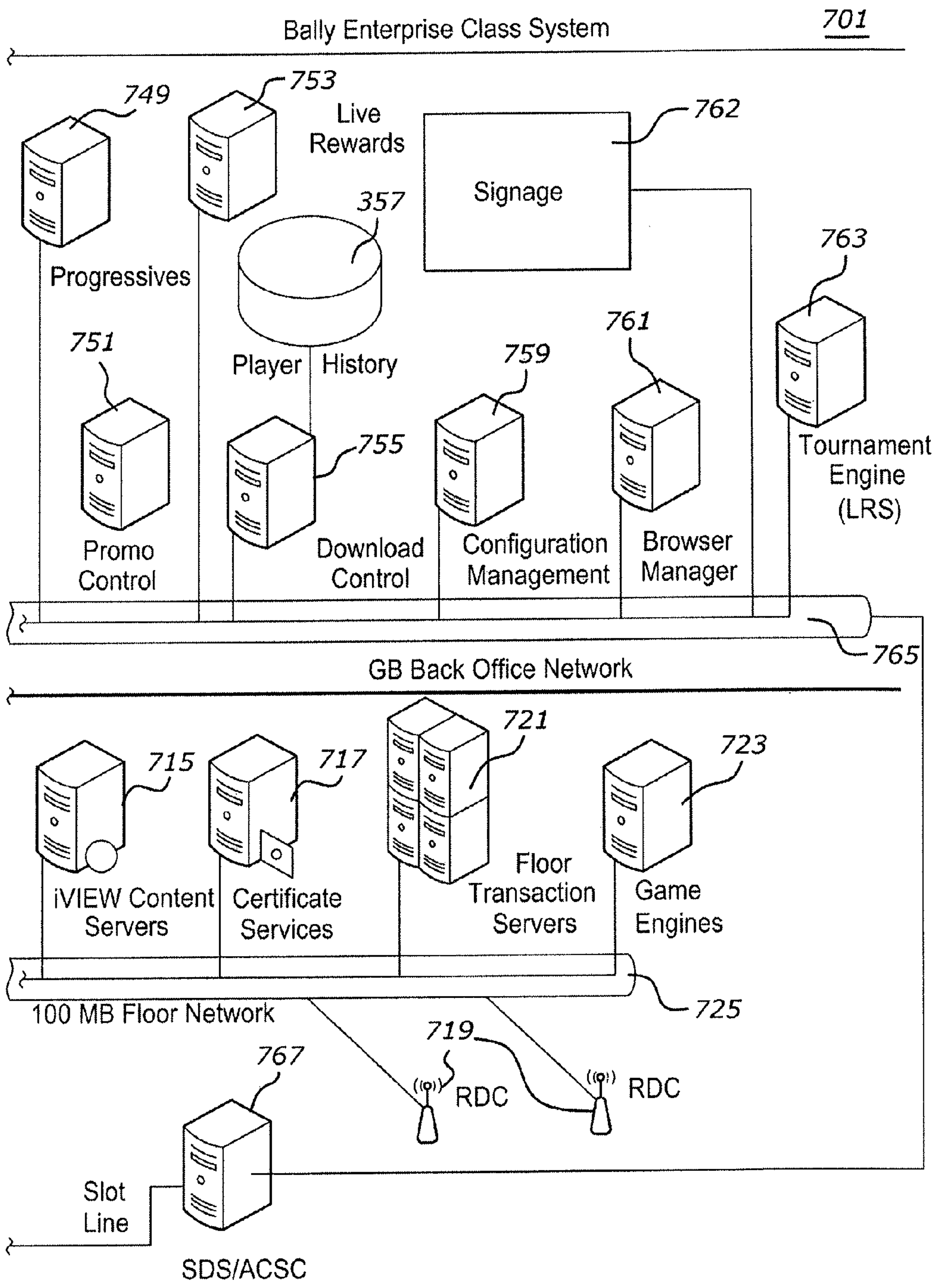

Referring to FIGS. 7*a* and 7*b*, enterprise gaming system 701 is shown in accordance with one or more embodiments. Enterprise gaming system 701 may include one casino or multiple locations and generally includes a network of gaming machines 703, floor management system (SMS) 705, and casino management system (CMS) 707. SMS 705 may include load balancer 711, network services servers 713, player interface (iVIEW) content servers 715, certificate services server 717, floor radio dispatch receiver/transmitters (RDC) 719, floor transaction servers 721 and game engines 723, each of which may connect over network bus 725 to gaming machines 703. CMS 707 may include location tracking server 731, WRG RTCEM server 733, data warehouse server 735, player tracking server 737, biometric server 739, analysis services server 741, third party interface server 743, slot accounting server 745, floor accounting server 747, progressives server 749, promo control server 751, bonus game (such as Bally Live Rewards) server 753, download control server 755, player history database 757, configuration management server 759, browser manager 761, tournament engine server 763 connecting through bus 765 to server host 767 and gaming machines 703. The various servers and gaming machines 703 may connect to the network with various conventional network connections (such as, for example, USB, serial, parallel, RS485, and Ethernet). Additional servers which may be incorporated with CMS 707 include a responsible gaming limit server (not shown), advertisement server (not shown), and a control station server (not shown) where an operator or authorized personnel may select options and input new programming to adjust each of the respective servers and gaming machines 703. SMS 705 may also have additional servers including a control station (not shown) through which authorized personnel may select options, modify programming, and obtain reports of the connected servers and devices. The various CMS and SMS servers are descriptively entitled to reflect the functional executable programming stored thereon, and the nature of databases is maintained and utilized in performing their respective functions.

Gaming machines 703 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 707 and/or SMS 305 servers and devices, firmware, media, operating systems, and configurations may be downloaded to the system components of respective gaming machines for upgrading or managing floor content and offerings in accordance with operator selections or automatically depending upon CMS 707 and SMS 705 master programming. The data and programming updates to gaming machines 703 are authenticated using conventional techniques prior to installation on the system components.

In various embodiments, any of the gaming machines 703 may be a mechanical reel spinning slot machine, a video slot machine, a video poker machine, a video bingo machine, a keno machine, or a gaming machine offering one or more of the above-described games including an interactive wheel feature. Alternately, gaming machines 703 may provide a game with an accumulation-style feature game as one of a set of multiple primary games selected for play by a random number generator, as described above. A gaming system of the type described above also allows a plurality of games in accordance with the various embodiments to be linked under the control of a group game server (not shown) for cooperative or competitive play in a particular area, carousel, casino or between casinos located in geographically separate areas. For example, one or more examples of group games under control of a group game server are disclosed in U.S. application Ser. No. 11/938,079, entitled “Networked System and Method for Group Gaming,” filed on Nov. 9, 2007, which is hereby incorporated by reference in its entirety for all purposes.

Those skilled in the art will readily recognize various modifications and changes that may be made to the claimed invention without following the example embodiments and applications illustrated and described herein, and without departing from the true spirit and scope of the claimed invention.

What is claimed is:

1. A gaming system for playing a base game and a feature game that includes an interactive animated representation of one or more portions of a wheel image, the system comprising:

a first display screen of a first gaming machine of a plurality of gaming machines configured to display the base game and a first portion of the wheel image in a feature game, the first portion amounting to at least part of a first wheel face portion rotating on an axis perpendicular to the first display screen;

a second display screen of a second gaming machine of the plurality of gaming machines configured to display a second portion of the wheel image in the feature game, the second portion amounting to at least part of a second wheel face portion rotating on an axis perpendicular to the second display screen;

a plurality of animated or physical reels, wherein the reels are spun during the play of the base game;

one or more player-activated buttons for receiving input from a player; and a processor configured to execute game software and process the input from the player-activated buttons;

wherein activation of the base game includes rotating the animated or physical reels;

wherein display of a particular symbol on one or more of the reels after the rotation has stopped triggers the feature game played with the portion of the wheel image;

wherein, by touching and dragging a finger of the player on the surface of the first portion of the wheel image displayed on the first display screen or on the surface of the second portion of the wheel image displayed on the second display screen, the first portion of the wheel image on the first display screen and the second portion of the wheel image on the second display screen synchronously move or spin at a variety of speeds and in either direction of rotation; and wherein the player moving his finger tangentially to the axis of the wheel image produces a greater rotational wheel speed, the closer his finger is to a center of the wheel image, due to creation of a higher rotational velocity than if the player had moved his finger at a same speed farther away from the center of the wheel image.

2. The system of claim 1, wherein the player is enabled to cock the wheel image by spinning the first portion of wheel image on first display screen or the second portion of the wheel image on the second display screen slightly in one direction before synchronously starting the wheel image in motion in an opposite direction on the first and second display screens.

3. The system of claim 1, wherein a wheel spin speed is based on the distance from where the player initially touches the wheel image to where the player removes his finger, when the player is attempting to move the wheel image in a direction.

4. The system of claim 1, wherein the player-activated buttons are touch screen virtual buttons.

5. The system of claim 1, wherein the player-activated buttons are physical buttons.

6. The system of claim 1, wherein the animated representation of the one or more portions of the wheel image comprises a full wheel image.

7. The system of claim 1, wherein the feature game that includes the animated representation of a wheel image is associated with one or more progressive prizes.

8. The system of claim 1, wherein the feature game is associated with one or more non-progressive prizes.

9. The system of claim 1, wherein the plurality of reels are placed behind transparent LCD windows.

10. The system of claim 9, wherein the reels are hidden by the appearance of masked prizes on the LCD windows in front of the plurality of reels when a feature game is triggered.

11. The system of claim 10, wherein, upon touching one of the masked prizes on the LCD windows, the prize value is revealed and awarded to the player.

12. The system of claim 1, wherein the base game includes awarding the feature game when certain symbols appear on a pay line, when certain symbols are scattered, or when no symbols of a certain type appear, regardless of visible symbols.

13. The system of claim 1, wherein the availability of the feature game is restricted based on a size of a wager, or a placement of the wager.

14. The system of claim 1, wherein a percentage of a wager is used to fund the feature game.

15. The system of claim 1, wherein a probability of winning the feature game is dependent on a size of a wager.

16. A gaming system for playing a base game and a feature game that includes an interactive animated representation of one or more portions of a wheel image, the system comprising:

a first display screen of a first gaming machine of a plurality of gaming machines configured to display the base game and a first portion of the wheel image in a feature game, the first portion amounting to at least part of a first wheel face portion rotating on an axis perpendicular to the first display screen;

a second display screen of a second gaming machine of the plurality of gaming machines configured to display a second portion of the wheel image in the feature game, the second portion amounting to at least part of a second wheel face portion rotating on an axis perpendicular to the second display screen;

a plurality of animated or physical reels, wherein the reels are spun during the play of the base game;

one or more player-activated buttons for receiving input from a player; and a processor configured to execute game software and process the input from the player-activated buttons;

wherein activation of the base game includes rotating the animated or physical reels;

wherein display of a particular symbol on one or more of the reels after the rotation has stopped triggers the feature game played with the portion of the wheel image;

wherein, by touching and dragging a finger of the player on the surface of the first portion of the wheel image displayed on the first display screen or on the surface of the second portion of the wheel image displayed on the second display screen, the first portion of the wheel image on the first display screen and the second portion of the wheel image on the second display screen synchronously move or spin at a variety of speeds and in either direction of rotation; and wherein at least the first gaming machine enables the player to cock the wheel image by spinning the first portion of the wheel image slightly in one direction before said synchronous moving or spinning of the first and second portions of the wheel image in a motion in an opposite direction of said cocking.

17. A gaming system for playing a base game and a feature game that includes an interactive animated representation of one or more portions of a wheel image, the system comprising:

a gaming server;

a gaming network connected to the gaming server;

two or more gaming devices connected to the gaming server via the gaming network, wherein the connected gaming devices are enabled for partner, group, or tournament game play, a first gaming device of the two or more gaming devices comprising a first display screen configured to display the base game and a first portion of the wheel image, the first portion amounting to at least part of a first wheel face portion rotating on an axis perpendicular to the first display screen, a second gaming device of the two or more gaming devices comprising a second display screen configured to display the base game and a second portion of the wheel image, the second portion amounting to at least part of a second wheel face portion rotating on an axis perpendicular to the second display screen, and each of the two or more gaming devices further comprising:

a plurality of physical reels or animated reels, wherein the reels are spun during the play of the base game;

one or more player-activated buttons for receiving input from a player; and a processor configured to execute game software and process input from the player-activated buttons;

wherein activation of the base game includes rotation of the reels;

wherein display of a particular symbol on one or more of the reels after the rotation of the reels has stopped triggers the feature game played with the interactive animated representation of the one or more portions of the wheel image;

wherein, by touching and dragging a finger of the player on the surface of the first portion of the wheel image displayed on a first display screen or on the surface of the second portion of the wheel image displayed on the second screen, the first portion of the wheel image on the first display screen and the second portion of the wheel image on the second display screen synchronously move or spin at a variety of speeds and in either direction of rotation; and wherein a wheel speed of said synchronous moving or spinning of the wheel image is based on the distance from where the player initially touches the wheel image to where the player removes his finger, when the player is attempting to move the wheel image in a direction.

* * * * *

UNITED STATES PATENT AND TRADEMARK OFFICE

CERTIFICATE OF CORRECTION

PATENT NO. : 8,834,259 B2
APPLICATION NO. : 13/975117
DATED : September 16, 2014
INVENTOR(S) : William Rommerdahl, Michael J. Schutt and James P. S. Kowalski It is certified that error appears in the above-identified patent and that said Letters Patent is hereby corrected as shown below:

IN THE SPECIFICATION:

Column 13, In line 31, replace “Kemal” with --Kernel--

Signed and Sealed this
Thirteenth Day of January, 2015

*Michelle K. Lee*

Michelle K. Lee
*Deputy Director of the United States Patent and Trademark Office*